(12) United States Patent
Li

(10) Patent No.: US 10,356,080 B2
(45) Date of Patent: Jul. 16, 2019

(54) SYSTEM AND METHOD FOR CENTRALIZED AUTHENTICATION AND AUTHORIZATION FOR CLOUD PLATFORM WITH MULTIPLE DEPLOYMENTS

(71) Applicant: Verizon Patent and Licensing Inc., Arlington, VA (US)

(72) Inventor: Minbao Li, Lewisville, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 197 days.

(21) Appl. No.: 15/462,633

(22) Filed: Mar. 17, 2017

(65) Prior Publication Data

US 2018/0270219 A1    Sep. 20, 2018

(51) Int. Cl.
*H04L 29/06* (2006.01)
*H04W 12/00* (2009.01)
*H04W 12/06* (2009.01)

(52) U.S. Cl.
CPC ........ *H04L 63/0815* (2013.01); *H04L 63/083* (2013.01); *H04L 63/10* (2013.01); *H04W 12/009* (2019.01); *H04W 12/06* (2013.01)

(58) Field of Classification Search
CPC .... H04L 63/0815; H04L 63/083; H04L 63/10
See application file for complete search history.

(56) References Cited

U.S. PATENT DOCUMENTS

| | | | | |
|---|---|---|---|---|
| 8,856,869 B1* | 10/2014 | Brinskelle | ............... | H04L 63/08 726/12 |
| 2013/0091557 A1* | 4/2013 | Gurrapu | ............... | H04W 4/60 726/5 |
| 2014/0337053 A1* | 11/2014 | Smith | ............... | G06Q 30/018 705/3 |
| 2016/0234198 A1* | 8/2016 | Breiman | ............... | H04L 63/0815 |
| 2018/0063143 A1* | 3/2018 | Wilson | ............... | H04L 63/0281 |
| 2018/0075231 A1* | 3/2018 | Subramanian | ............... | G06F 21/41 |
| 2018/0131684 A1* | 5/2018 | Standefer, III | ............... | G06F 17/30867 |
| 2018/0270219 A1* | 9/2018 | Li | ............... | H04L 63/0815 |
| 2018/0375886 A1* | 12/2018 | Kirti | ............... | H04L 63/1425 |
| 2019/0068627 A1* | 2/2019 | Thampy | ............... | G06N 20/00 |

* cited by examiner

*Primary Examiner* — Saleh Najjar
*Assistant Examiner* — Louis C Teng

(57) ABSTRACT

Techniques described herein may be used to centralize authentication and authorization for accessing cloud services provided by different cloud platform deployments. A user equipment (UE) may provide user information to a cloud admin server. The cloud admin server may authenticate and authorize the UE locally and then initiate a sign on procedure with each cloud platform deployment. The sign on procedure may include obtaining user group information for the user and providing the user group information to the cloud platform deployments so that the cloud platform deployments may return permission information without having to each perform an authentication and authorization procedure. The cloud admin server may relay the permission information to the UE, and the UE may use the permission information to access any/all of the cloud services.

20 Claims, 8 Drawing Sheets

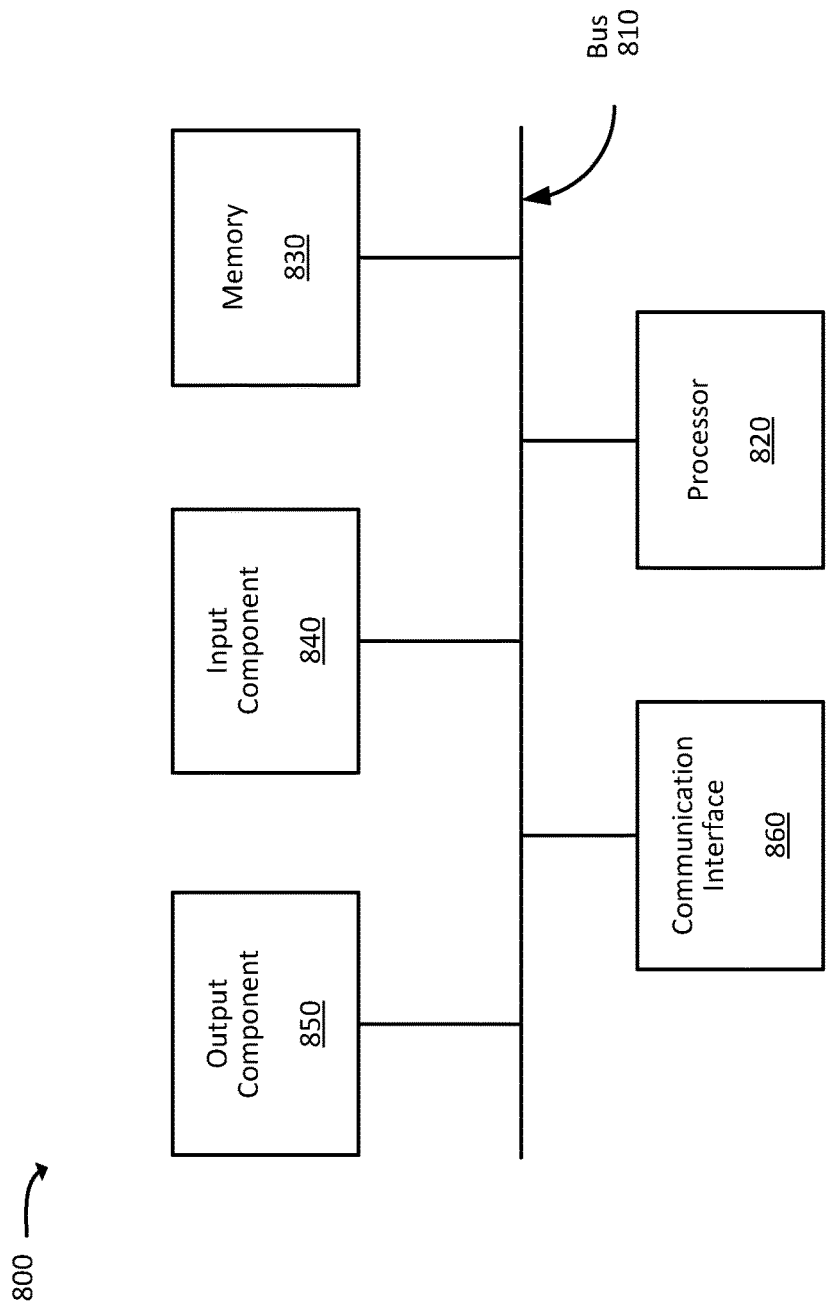

SYSTEM AND METHOD FOR CENTRALIZED AUTHENTICATION AND AUTHORIZATION FOR CLOUD PLATFORM WITH MULTIPLE DEPLOYMENTS

BACKGROUND

Cloud computing services are often made available using a distributed software platform that is implemented across multiple server devices of a data center. A cloud computing platform (also referred to herein as "cloud platform") may include a software framework for installing and deploying cloud services, tools to manage server resources (e.g., processing, memory, storage, and networking capabilities), security and identity services, etc. An example of a cloud platform may include the OpenStack platform, which may include an identity service referred to as Keystone. Keystone may manage access to cloud services deployed via OpenStack, by providing a user authentication and authorization service and a cataloging tool for managing location information (e.g., Universal Resource Locators (URLs)) of the deployed services.

BRIEF DESCRIPTION OF THE DRAWINGS

Embodiments of the present disclosure will be readily understood by the following detailed description in conjunction with the accompanying drawings. To facilitate this description, like reference numerals may designate like structural elements. Embodiments of the disclosure are illustrated by way of example and not by way of limitation in the figures of the accompanying drawings.

FIG. 8 is a block diagram of example components of a device.

DETAILED DESCRIPTION OF PREFERRED EMBODIMENTS

Figure 1:
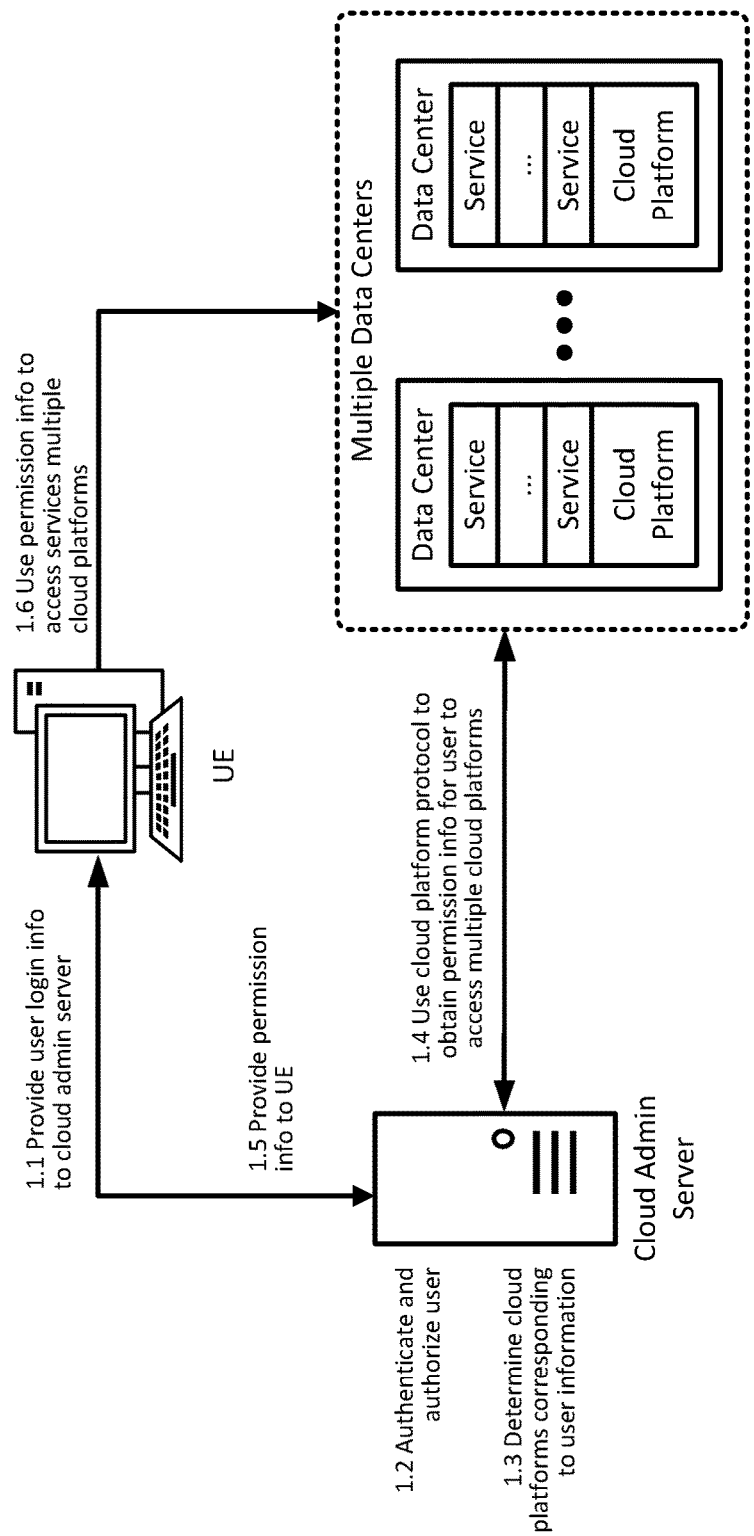
FIG. 1 illustrates an example overview of an embodiment described herein.

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the appended claims and their equivalents.

Cloud computing platforms, such as OpenStack, may provide a software environment with tools and features for providing services in a cloud computing environment (also referred to herein as cloud services). Examples of such services may include customer profile management services, customer subscription services, billing services, network access, etc.). However, cloud computing platforms, including OpenStack, may have certain limitations. For example, the authentication and authorization tools of cloud computing platforms may be limited to a particular instance (or deployment) of the cloud computing platform. Thus, a cloud platform deployment, as described herein, may include an instance of a cloud computing framework that may include identity tools (for authenticating and authorizing users) and a software platform upon which cloud services may be installed and provided to users. As such, a business (or another type of organization) may provide a user with access to multiple cloud services. However, if those services are hosted by different cloud platform deployments, the user may be required to login (e.g., complete an authentication and authorization process by providing a username and password) for each cloud platform deployment on an individual basis. For example, the user may be required to input the same or different username and password each time the user logs into a different cloud platform deployment to access a cloud service.

Additionally, using a Single Sign On (SSO) system does not overcome these issues. Before a user may access a service at a cloud platform deployment, the user must be authenticated (e.g., the identity of the user must be verified) and authorized (e.g., it must be verified that the user is authorized to access the service, such as verifying that the user has an account and/or appropriate permissions) to do so. As such, while a SSO system may be capable of authenticating a user, the SSO system could not assist with authorization of the user for a cloud platform deployment. Cloud deployments may each use a different system, such as OpenStack, to determine whether a particular user or client device is authorized to access a service associated with the cloud platform deployment. As such, while a SSO system may assist with authenticating a user, the user (e.g., once authenticated) would still have to obtain authorization from each cloud platform deployment on an individual basis (e.g., by individually obtaining authorization from each service, which the user wishes to access, after authentication).

The techniques described herein may be used to centralize authentication and authorization when accessing cloud services provided by different cloud platform deployments, such that a user may obtain access to all services (to which the user is subscribed/permitted) by completing a single authentication and authorization procedure at a centralized device (referred to herein as "cloud administration (admin) server"). As described herein, the cloud admin server may obtain authorization for a user by, for example, implementing a client simulator that communicates with the cloud platform deployments, thereby causing the cloud platform deployments to interact with the cloud admin server as though the cloud admin server was a client device (e.g., a user device).

Additionally, the cloud admin server may be configured to communicate with the cloud computing platforms using a standardized and available communication protocols (e.g., SAML (Security Assertion Markup Language), OpenID Connect, etc.), such that the techniques described herein may be implemented without having to modify or develop new cloud computing platforms or protocols. Furthermore, since the cloud admin server may authenticate and authorize the UE, the techniques described herein may centralize the authentication and alleviate the need for the cloud computing platforms to do so individually, thereby freeing up server resources for other operations.

FIG. 1 illustrates an example overview of an embodiment described herein. As shown, a User Equipment (UE) (e.g., a mobile phone, a desktop computer, laptop computer, tablet computer, etc.) may provide user login information (e.g., a username and password) to a cloud admin server. The UE may provide the information as part of a request, or another type of message, for obtaining access to cloud services available at different cloud platform deployments in one or more data centers. Each data center may include a warehouse, or another type of building, with multiple servers capable of running a cloud computing platform, such as the OpenStack platform.

In response to receiving the user login information, the cloud admin server may authenticate and authorize the user for accessing the services provided by the cloud platform deployments (at 1.2). The cloud admin server may also determine, based on the user login information, which cloud platform deployments provide the services that the user is attempting to access. The cloud admin server may communicate with the cloud platform deployments to obtain permission information for the UE to access the services (at 1.4). Permission information, as described herein, may include a token, a cookie, or another type of information that indicates that the UE has been authenticated by the cloud admin server. The cloud admin server may do so using a sign on protocol, such as SAML, OpenID Connect, etc., that the cloud platform deployments are already configured to use (as opposed to, for example, a new or ad hoc, sign on protocol that might be otherwise necessitated by the function of the cloud admin server as described herein).

The cloud admin server may relay the permission information to the UE (at 1.5), and the UE may use the permission information to access any (or all) of the services for which the UE is authorized (at 1.6). For example, the UE may provide the permission information (e.g., a token, a cookie, etc.) to cloud platform deployments to obtain access to the services provided by the cloud platform deployments. As such, instead of having to complete an authentication and authorization procedure for each cloud admin server, the techniques described herein may enable the UE to obtain permission to access all the services (for which the user is subscribed or otherwise entitled) by completing a single authentication and authorization procedure.

As such, the techniques described herein may provide a centralized device (the cloud admin server) to authenticate and authorize a UE requesting to access cloud services hosted by different cloud platform deployments. The cloud admin server may communicate with the cloud platform deployments to obtain permission information that the UEs may use to access the cloud services. In this manner, the cloud admin server may alleviate the need of the cloud platform deployments to individually authenticate and authorize the UE to access the cloud servers. Additionally, to obtain the permission information, the cloud admin server may communicate with the cloud platform deployments using a standardized and available protocol (e.g., Standard Sign On Federation protocol, such as SAML or OpenID). This may enable the techniques, described herein, to be implemented without having to develop a completely new cloud platform or customize an existing cloud platform (such as OpenStack).

Figure 2:
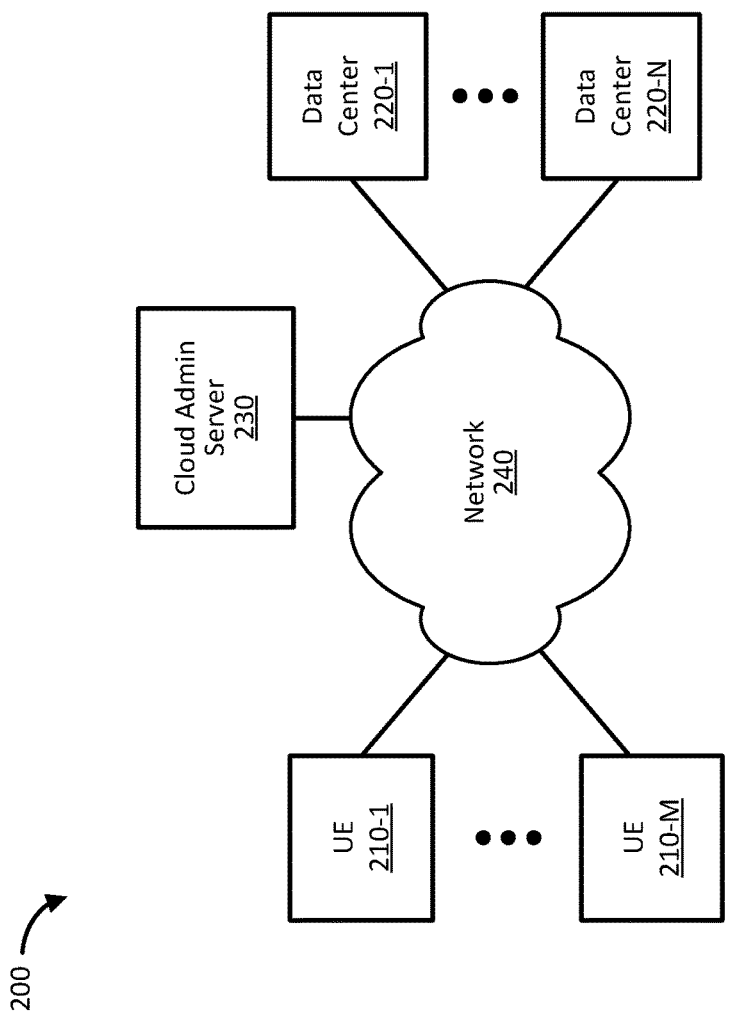
FIG. 2 is a diagram of an example environment in which systems and/or methods described herein may be implemented.

FIG. 2 is a diagram of an example environment 200 in which systems and/or methods described herein may be implemented. Environment 200 may include UE 210-1 through 210-M (which may be referred to herein individually as "UE 210" or collectively as "UEs 210"), data center 220-1 through 220-N (which may be referred to herein individually as "data center 220" or collectively as "data centers 220"), cloud admin server 230, and network 240.

The quantity of devices and/or networks, illustrated in FIG. 2, is provided for explanatory purposes only. In practice, environment 200 may include additional devices and/or networks; fewer devices and/or networks; different devices and/or networks; or differently arranged devices and/or networks than illustrated in FIG. 2. For example, while not shown, environment 200 may include devices that facilitate or enable communication between various components shown in environment 200, such as routers, modems, gateways, switches, hubs, etc. Alternatively, or additionally, one or more of the devices of environment 200 may perform one or more functions described as being performed by another device of environment 200. Additionally, the devices of environment 200 may interconnect with each other, and/or other devices, via wired connections, wireless connections, or a combination of wired and wireless connections. In some embodiments, one or more devices of environment 200 may be physically integrated in, and/or may be physically attached to, one or more other devices of environment 200. Also, while "direct" connections are shown in FIG. 2 between certain devices, some devices may communicate with each other via one or more additional devices and/or networks.

UE 210 may include a portable computing and communication device, such as a personal digital assistant (PDA), a smart phone, a cellular phone, a laptop computer with connectivity to network 240. UE 210 may connect to network 240 via a base station of a wireless telecommunication network, a WiFi access point and Internet modem, etc. UE 210 may also include a non-portable computing device, such as a desktop computer, a consumer or business appliance, or another device that can connect to a RAN of the wireless telecommunications network. UE 210 may also include a computing and communication device that may be worn by a user (also referred to as a wearable device) such as a watch, a fitness band, a necklace, glasses, an eyeglass, a ring, a belt, a headset, or another type of wearable device.

Figure 3:
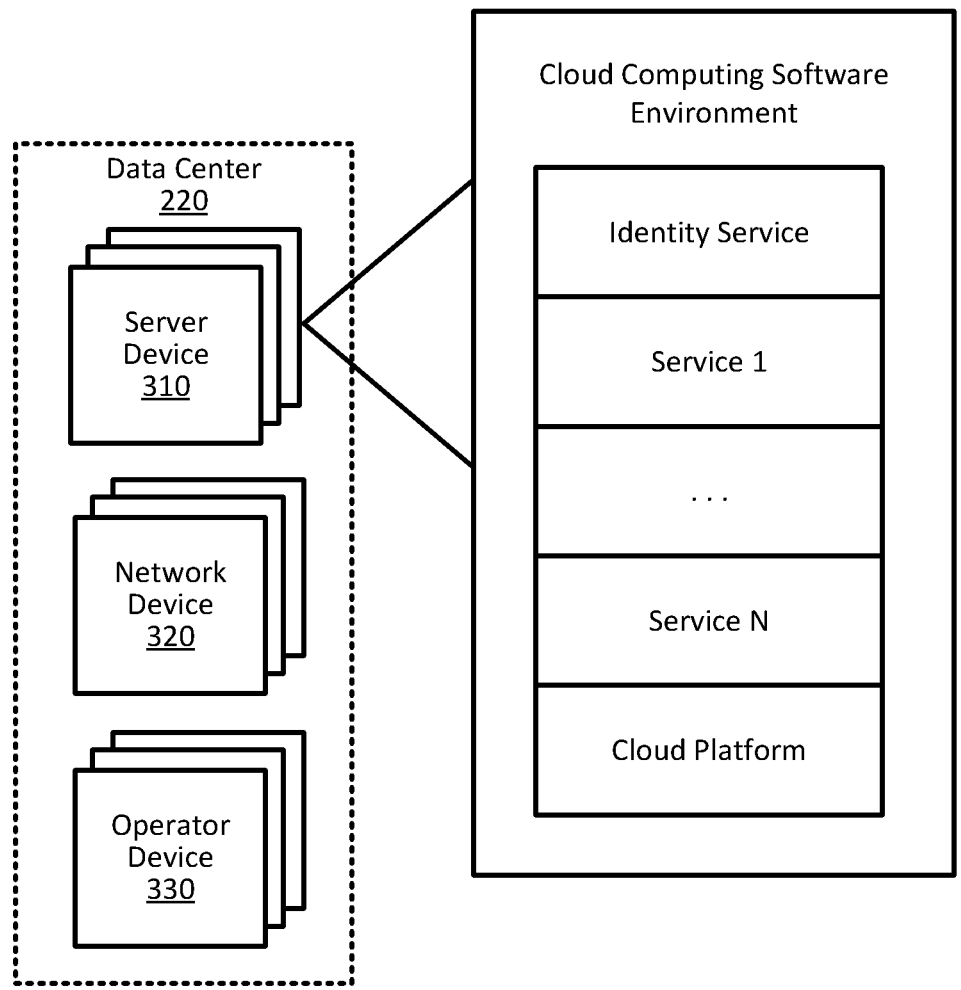
FIG. 3 is a diagram of an example of a data center.

Data center 220 may include multiple servers capable of sharing hardware resources (e.g., processing, memory, storage, and networking capacity) to provide cloud computing services. Data center 220 may be located in a dedicated building, such as a warehouse or other facility capable of housing data center 220. The servers may include one or more cloud platform deployments, such as instances of OpenStack, that enable the servers to provide an Infrastructure-as-a-Service (IaaS) solution though a set of interrelated services. Examples of such services may include an authentication and authorization service (e.g., an identity service), and a service to catalog and manage deployed services by the cloud platform deployment. Each service may include an Application Programming Interface (API) that facilitates integration into the cloud computing environment. Data center 220 may include other types of computing devices as well, such as routers, switches, and hubs that connect the servers to one another, and operator devices 330 (e.g., as shown in FIG. 3) that enable technicians to configure, monitor, maintain, and manage the servers of data center 220. A detailed example of data center 220, in accordance with some embodiments, is provided below regarding FIG. 3.

Cloud admin server 230 may include one or more computing devices, such as a server device or a collection of server devices, capable of communicating with other devices (e.g., UE 210 and the devices of data center 220) via network 240. Cloud admin server 230 may include an operating system and/or other software that enables cloud admin server 230 to perform one or more of the operations described herein. For example, cloud admin server 230 may receive a request from UE 210 to access services provided by cloud platform deployments that are provided at one or more data centers 220. Additionally, cloud admin server 230 may communicate with the cloud computing platforms, on behalf of UE 210, for authentication and authorization purposes, in addition to providing UE 210 with permission information for accessing all of the cloud services for which UE 210 is authorized.

Network 240 may include one or more wired and/or wireless networks. For example, network 240 may include a cellular network (e.g., a second generation (2G) network, a third generation (3G) network, a fourth generation (4G) network, a fifth generation (5G) network, a Long-Term Evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 240 may include a local area network (LAN), a wireless LAN (WLAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

FIG. 3 is a diagram of an example of data center 220. As shown, data center 220 may include one or more server devices 310, network devices 320, and operator devices 330. The quantity of devices and/or networks, illustrated in FIG. 3, is provided for explanatory purposes only. In practice, data center 220 may include additional devices, fewer devices, different devices, or differently arranged devices than illustrated in FIG. 3.

Server device 310 may include one or more computing devices, such as a server device or a collection of server devices, capable of operating in a cloud computing environment. For example, server device 310 may include a computing device with an operating system and/or other software that enables server device 310 to create and configure virtual devices, which may be arranged in different ways and configured to provide different services. A virtual device (also referred to herein as a virtual network function (VNF)) may include a software function that is hosted by server device 310 and that operates in a manner that simulates a physical computing device (e.g., a server device, a user device, a network device, etc.). In some embodiments, virtual devices may be part of a virtual network (e.g., a Software Defined Network (SDN)).

Network device 320 may include one or more devices that facilitate or enable communications between various devices shown in environment 200 (e.g., server devices 310 and operator devices 330). Examples of network device 320 may include routers, modems, gateways, switches, hubs, etc. Network devices 320 may be arranged and configured to interconnect the server devices 310 and operator devices 320 in one or more ways, in addition to providing a connection between the data center and network 240 of FIG. 2.

Operator device 330 may include a computing and communication terminal. In some embodiments, operator device 330 may include a portable device, such as a smart phone, a laptop computer, a tablet computer, etc. Operator device 330 may also include non-portable computing devices, such as a desktop computer, a consumer or business appliance, or other devices that can connect to network 240. Operator device 330 may also include a computing and communication device that may be worn by a user (also referred to as wearable devices) as a watch, a fitness band, a necklace, glasses, an eyeglass, a ring, a belt, a headset, or another type of wearable device.

Figure 4:
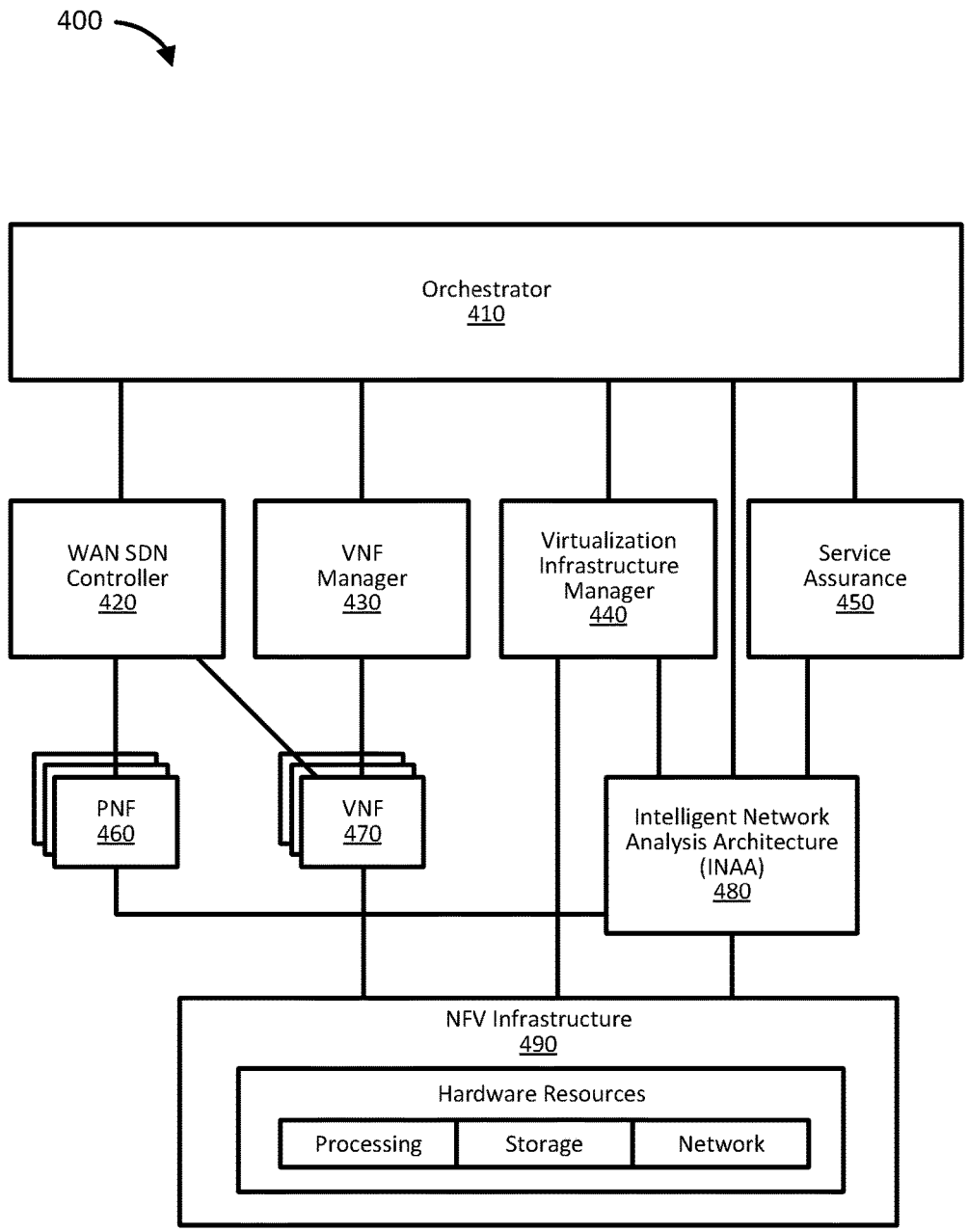
FIG. 4 is a diagram of an example of a virtual network that may be implemented across the server devices of one or more data centers.

FIG. 4 is a diagram of an example of a virtual network 400 that may be deployed across server devices 310 of one or more data centers 220. Virtual network 400 may be an example of a Software Defined Network (SDN). As described below, virtual network 400 may include virtualized embodiments of physical devices (e.g., a router, a hub, a server, a data storage device, etc.) or a function of a physical device (e.g., an authentication and authorization function, a user account management function, a customer billing function, etc.). In practice, types of virtual devices and/or virtual functions (also referred to herein as virtual network functions (VNFs)) implemented by virtual network 400 may vary.

As shown, virtual network 400 may include orchestrator 410, wide area network SDN (WAN SDN) controller 420, VNF manager 430, virtualization infrastructure manager 440, service assurance 450, physical network functions (PNFs) 460, virtual network functions 470, intelligent network analysis architecture (INAA) 480, and network function virtualization (NFV) infrastructure (NFVI) 490. Virtual network 400 may include a combination of virtualized functions (e.g., one or more of blocks 410-450 and/or 470-490) and physical devices (also referred to as PNFs 260). In some embodiments, the virtual functions may be implemented on one or more server devices 210 of a data center, while PNFs 260 may be implemented by one or more computing and/or communication devices (e.g., UE 210, cloud admin server 230, network device 320, operator device 330, etc.).

Orchestrator 410 may be responsible for allocating, instantiating, and activating network functions throughout virtual network 400. WAN SDN controller 420 may be responsible for control connectivity services in a WAN operated by example network 400. VNF manager 430 may be responsible for VNF lifecycle management, which may include instantiation of VNFs, upgrading VNFs, scaling for VNFs, terminating VNFs, etc. Virtualization infrastructure manager 440 may be responsible for allocating physical resources (e.g., processing capacity, memory capacity, storage capacity, etc.) to the embodiment of the virtualized functions of example network 400. In some embodiments, the physical resources managed by virtualization infrastructure manager 440 may include the physical resources of one or more server devices 210 of a data center.

Service assurance 450 may be responsible for collecting and monitoring data, which may include events, conditions, messages, performance levels, etc., of virtual network 400. The collected data may be used by one or more virtual functions of network 400. For example, as described in detail regarding FIGS. 6-8, the information collected and monitored by service assurance 450 may enable INAA 480 to determine faults within the network, determine appropriate corrections for the faults in the network, etc. PNF 460 may include a network function that may rely on dedicated hardware and software for part of its functionality. In some embodiments, PNFs 460, such as PNFs that correspond to enhanced Node Bs (eNBs) may be controlled by WAN SDNs 420 (as shown); however, other types of PNFs may be controlled by other types of devices and/or functions. In some embodiments, PNF 460 may include an eNB or another type of device through which UEs may connect to example network 400. In some embodiments, data from PNFs may be inputs to INAA 480.

VNFs 470 may include a software implementation of a network device (and/or a function of a network device). Examples of VNFs 470 may include one or more devices of an EPC, such as SGW 330, PGW 340, MME 350, etc. INAA 480 may be responsible for identifying faults occurring within network 400, determining appropriate corrections to the faults, implementing the correction in order to remedy the fault, and more. In some embodiments, INAA 480 may receive information about the desired state of the network (e.g., information about how the network is intended to functions). Doing so may, for example, enable INAA 480 to compare the actual or monitored state of the network with the desired state of the network, in order to develop ways (e.g., rules, policies, configurations, etc.) to improve the actual state of the network. Detailed examples of such operations are discussed below regarding FIGS. 6-8. NFVI 490 may include hardware (e.g., processors, memory, storage capacity, etc.) and software components (e.g., an operating system, applications for creating and managing VNFs, etc.) upon which the virtual functions of network 400 are deployed.

The quantity of physical and virtual components, illustrated in FIG. 4, is provided for explanatory purposes only. In practice, network 400 may include additional components, fewer components, different components, or differently arranged components than illustrated in FIG. 4. Alternatively, or additionally, one or more of the components of network 400 may perform one or more functions described as being performed by another component of network 400. In some embodiments, one or more components of network 400 may be physically (or virtually) integrated in, and/or may be physically (or virtually) attached to, one or more other components of network 400. Also, while "direct" connections are shown in FIG. 4 between certain components, some components may communicate with each other via one or more additional components.

Figure 5:
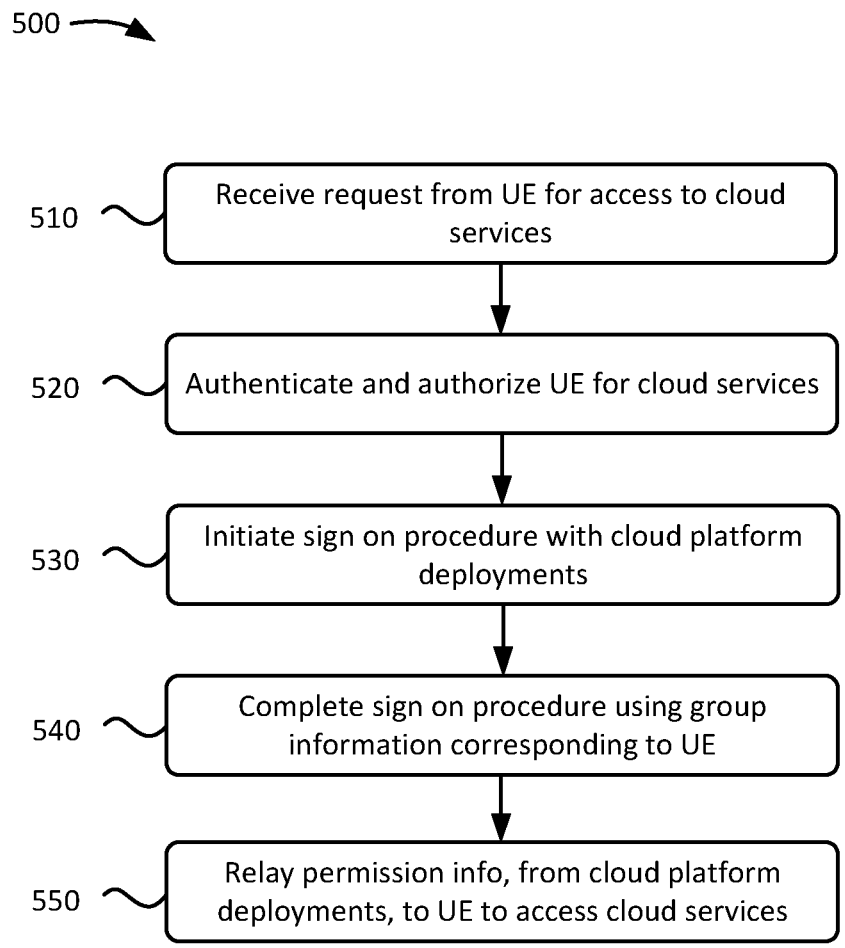
FIG. 5 is a diagram of an example process for centralized authentication and authorization for a cloud platform with multiple deployments.

FIG. 5 is a diagram of an example process 500 for centralized authentication and authorization for a cloud platform with multiple deployments. Process 500 may be performed by cloud admin server 230. The following description of FIG. 5 includes a generalized example of the techniques described herein. A more detailed example is provided below regarding FIG. 7.

As shown, process 500 may include receiving a request from UE 210 for access to cloud computing services (block 510). For example, cloud admin server 230 may provide a user interface (UI) to UE 210 (e.g., in the form of a webpage). The UI may enable a user of UE 210 to enter a single set of login information (e.g., a username and password) that corresponds to a user account associated with multiple cloud services (e.g., cloud services provided by different cloud platform deployments). Via the UI and UE 210, the user may communicate a request (along with the user information) to cloud admin server 230 for access to the cloud services corresponding to the user information and/or user account. In other words, instead of having to provide the same username and password to each cloud platform deployment that is hosting a cloud service that the user may want/need to access (e.g., as might typically be done in conventional systems that implement a single sign on procedure), the user may submit the username and password once (e.g., to the cloud admin server via the UI) to request access to all of the cloud services to which the user is entitled (e.g., has been previously registered for). In some embodiments, the user may specify (e.g., when submitting the request) which cloud services the user would like to access. In some embodiments (e.g., when the user does not specify certain cloud services), the request may, by default, include a request for access to any/all of the cloud services for which the login information corresponds.

Process 500 may also include authenticating and authorizing UE 210 for the cloud computing services (block 520). For example, cloud admin server 230 may perform an authentication and authorization procedure in response to the request, from UE 210, to access the cloud services. In some embodiments, the authentication and authorization procedure may include cloud admin server 230 comparing the login information received from UE 210 to a local database of authentication information. In such embodiments, the authentication information in the local database may have been received as part of a previous registration process. For example, a user wanting access to one or more cloud services may contact (e.g., by phone, over the Internet, via a registration portal, etc.) a business that provides the cloud services described herein. The user may create a user account (which may include specifying a username and password), select one or more cloud services offered by the business, and provide payment information to pay for the cloud services. In this manner, a user may become registered for one or more cloud services.

In some embodiments, an organization (e.g., a business, a research institution, etc.) may create multiple user accounts for individuals (e.g., employees, researchers, etc.) associated with the organization, such that each individual may have their own user account. These individuals may be organized into groups of users (also referred to herein as user groups), and each group of users may be associated with one or more cloud services. Thus, a user group, as described herein, may include a logical grouping of users, with a group ID, and information identifying cloud services that correspond to the user group. In such a scenario, each user of a particular user group may gain access to whichever cloud services correspond to that user group by logging in with his or her unique username and password.

For example, users in Group A may be salesmen in a company, and may be associated with cloud services related to customer acquisition, product catalogs, etc. Users in Group B may be human resource personnel in the company, and may be associated with cloud services related to retaining employee information, signing employees up for benefits, etc. A user in Group A, when signing in with his or her username and password, may be signed in to the cloud services related to customer acquisition, product catalogs, etc.; whereas a user in Group B, when signing in with his or her username and password, may be signed in to the cloud services related to retaining employee information, signing employees up for benefits, etc.

In some embodiments, the registration process may be implemented by cloud admin server 230. In some embodiments, the registration process may be implemented by one or more other devices, such as on one or more cloud platform deployments. In such embodiments (e.g., when the registration process is implemented by a device or service other than the cloud admin server 230), the cloud admin server may retrieve the information resulting from the registration process (e.g., user accounts, login information, group information, etc.) from that other device or service.

In some embodiments, the authentication and authorization procedure performed by cloud admin server 230 may include providing the login information (received from the user of UE 210) to a Lightweight Directory Access Protocol (LDAP) server capable of authenticating the login information. As described herein, the authentication and authorization procedure performed by cloud admin server 230 may (in a functional sense) replace the typical requirement for UE 210 to complete an authentication and authorization procedure for multiple cloud platform deployments.

Process 500 may also include initiating a sign on procedure with the cloud platform deployments (block 530). For example, cloud admin server 230 may initiate a sign on procedure with the cloud platform deployments hosting the cloud services for which UE 210 has requested access. In some embodiments, cloud admin server 230 may identify the relevant cloud platform deployments based on information stored in a local database. The sign on procedure initiated by cloud admin server 230 may be in accordance with a sign on protocol that is familiar to the cloud platform deployments (e.g., SAML, OpenID Connect, etc.). Thus, the cloud admin server may be configured to obtain authorization for UE 210 by using an existing sign on protocol (e.g., the Federation Sign On protocol), such that the techniques described herein may be implemented without having to create a new (or customized) sign on protocol or cloud platform. A more detailed explanation of the manner in which cloud admin server 230 may use the customary/established protocol to complete the sign on procedure is provided below regarding FIGS. 6 and 7.

Process 500 may also include completing the sign on procedure based on group information that corresponds to UE 210 (block 540). For example, the cloud platform deployments hosting the cloud services for which UE 210 has requested access may implement a sign on protocol (e.g., a Sign On Federation protocol, such as SAML, OpenID Connect, etc.) that supports access privileges to user groups (e.g., user accounts that are organized into a logical group). In implementations that do not provide centralized authentication and authorization, the sign on protocol may include cloud platform deployments individually receiving user login information from UE 210 and authenticating UE 210 based on the user login information. For example, if a user has a user account that is associated with cloud service X and cloud service Y, which are hosted by cloud platform deployments 1 and 2, respectively, the user would have to login in to cloud platform deployment 1 to access cloud service X and then (using the same login username and password) have to login to cloud platform 2 in order to access cloud service Y. However, in an embodiment, when cloud platform deployments receive group information (instead of user login information) from a source (such as the cloud admin server 230) that is already trusted by the cloud platform deployments, the sign on protocol (e.g., a Sign On Federation protocol, such as SAML, OpenID Connect, etc.), may enable cloud platform deployments to return permission information without having to authenticate the device providing the group information.

As such, cloud admin server 230 may complete the sign on procedure, on behalf of UE 210, by providing group information (corresponding to a group to which UE 210 pertains) to all cloud platform deployments. To do so, cloud admin server 230 may determine a user group (e.g., a group of users belonging to a company or another organization) that corresponds to the login information provided by UE 210. Additionally, in accordance with the sign on procedure implemented by the cloud platform deployments, cloud admin server 230 may provide group information to each cloud platform deployments. In some embodiments, the group information may include a group ID corresponding to the user group and information identifying the services associated with the user group. In such embodiments, cloud platform deployments may identify the cloud services corresponding to the user group based on the group ID. In some embodiments, the group information may include permission information, such that cloud admin server 230 may provide permission information for accessing the cloud services associated with the user group corresponding to the user. In such embodiments, cloud admin server 230 may provide the permission information (as group information) to the cloud platform deployments, and the cloud platform deployments may store the permission information so that, for example, when the permission information is later forwarded to, and used by UE 210 to access the cloud services, the cloud platform deployments will recognize the permission information and grant UE 210 access to the cloud services.

The permission information may be, or include, a token, cookie, and/or other type of file, data, or information that is provided to the cloud services associated with a particular group. The permission information may also be provided to one or more UEs 210, in the group, when the one or more UEs 210 are authenticated by cloud admin server 230. When accessing, or attempting to access, a particular cloud service (i.e., a cloud service that is associated with the group), UE 210 may provide the permission information to the particular cloud service, so that the particular cloud service can verify that the UE 210 is authorized to access the particular cloud service (e.g., by comparing the permission information, provided by UE 210, to the permission information previously provided by cloud admin server 230). The permission information may specify certain permissions of actions that UE 210 is authorized to perform, such as reading files, writing files, deleting files, etc. The permission information may additionally, or alternatively, specify other types of actions not specifically identified here.

In some embodiments, the group information may include IDs for the cloud services associated with the user group, and cloud platform deployments 220 may identify the cloud services, corresponding to the user group, based on the IDs for cloud services. In some embodiments, a user may not be associated with a user group. In such a scenario, cloud admin server 230 may create a user group for the user (even though the user group consists of only the one user). The newly created user group may be associated with the same cloud services as the user's individual account. In some embodiments, prior to requesting (on behalf of UE 210) permission information from the cloud platform deployments, cloud admin server 230 may update the cloud platform deployments regarding the newly created group so that (for example) the cloud platform deployments will be able to respond appropriately (e.g., with permission information) when cloud admin server 230 later sends group information of the newly created group. In response to receiving the group information, the cloud platform deployments may respond by providing permission information (e.g., a token, etc.) to the cloud admin server 230. The permission information may be used by UE 210 to access the cloud services to which the group (and thereby the user) is registered or otherwise associated.

Process 500 may also include relaying permission information, from cloud platform deployments, to UE 210 (block 550). For example, as a result of the sign on procedure discussed above, cloud admin server 230 may receive, from the cloud platform deployments, permission information for accessing the services for which UE 210 requested access. Additionally, cloud admin server 230 may communicate the permission information to UE 210 so that UE 210 may subsequently access the cloud services. In some embodiments, the permission information may include one or more cookies, tokens, and/or other suitable information that cloud admin server 230 receives from the cloud platform deployments and provides to UE 210. In some embodiments, a bridge program (that shares a domain with the cloud platform deployments) may be used to receive and/or provide the permission information to UE 210. In such embodiments, for example, the bridge program may retrieve a cookie, via cloud admin server 230, by calling an appropriate URL/program in cloud admin server 230 and then providing the cookie to UE 210.

Figure 6:
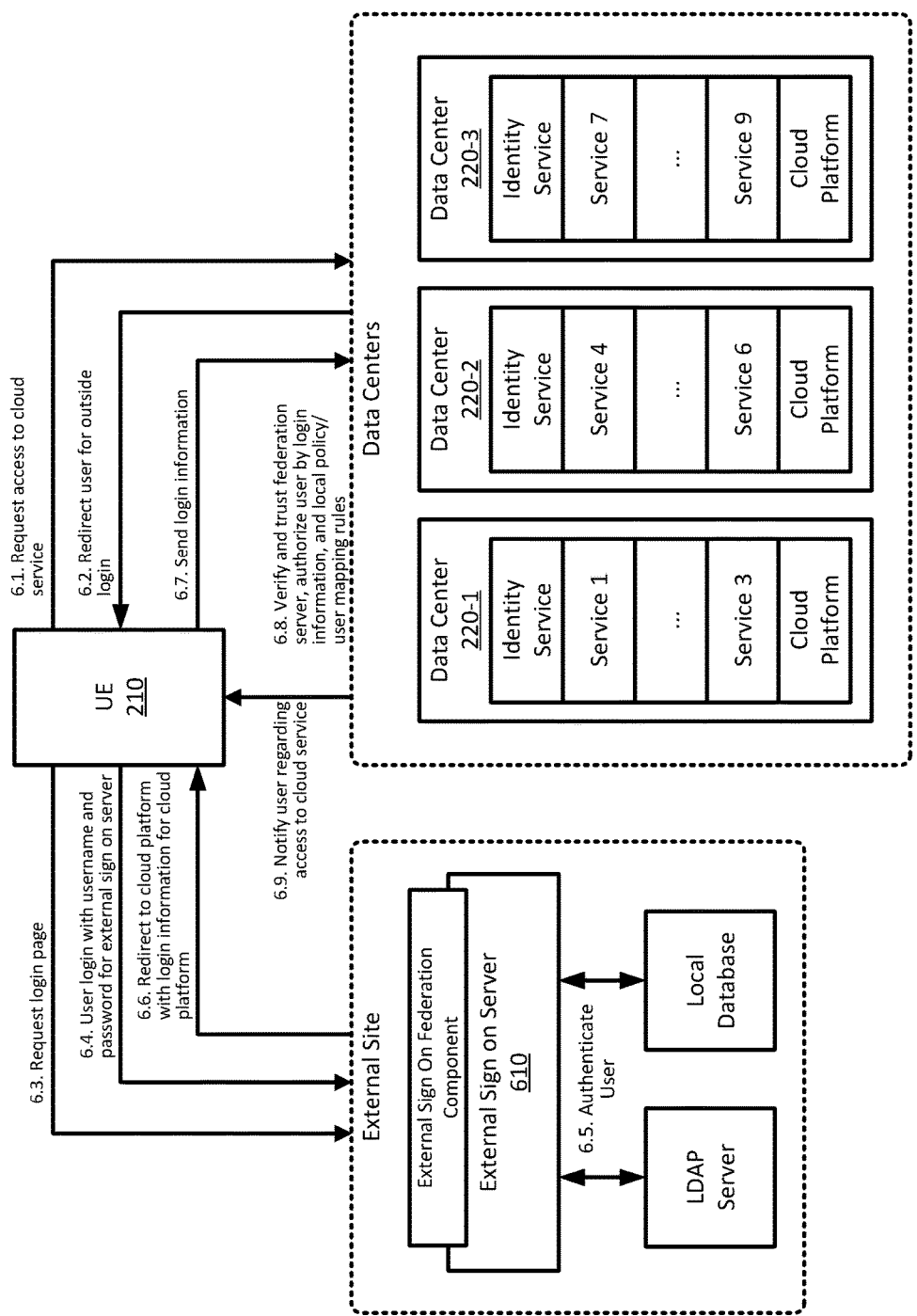
FIG. 6 is a diagram of an example implementation that does not provide centralized authentication and authorization.

FIG. 6 is a diagram of an example implementation that does not provide centralized authentication and authorization. As shown, UE 210 may request access a cloud service hosted by a cloud platform deployment of a particular data center (at 6.1). An identity service of the cloud platform deployment may respond with a Redirect message (at 6.2) that causes UE 210 to request a login webpage from external sign on server 610 (at 6.3). As shown, external sign on server 610 may include an external sign on federation component that enables external sign on server 610 to operate in accordance with a Federation protocol, such as SAML or OpenID Connect, an example of which is depicted in FIG. 6.

UE 210 may provide external sign on server 610 with user information (e.g., a username and password) (at 6.4), and external sign on server 610 may communicate with a local database and an LDAP server to authenticate the user information (at 6.5). External sign on server 610 may provide UE 210 with login information for the cloud platform deployment corresponding to the requested service (at 6.6), and UE 210 may send the login information to that cloud platform deployment (at 6.7). In response, the cloud platform deployment may determine that the login information originated from a trusted source (i.e., external sign on server 610) and authorize UE 210 to access the service based on a combination of the login information and local policy/ user mapping rules (at 6.8). Additionally, the cloud platform deployment may notify UE 210 that access to the cloud service has been granted (at 6.9).

Figure 7:
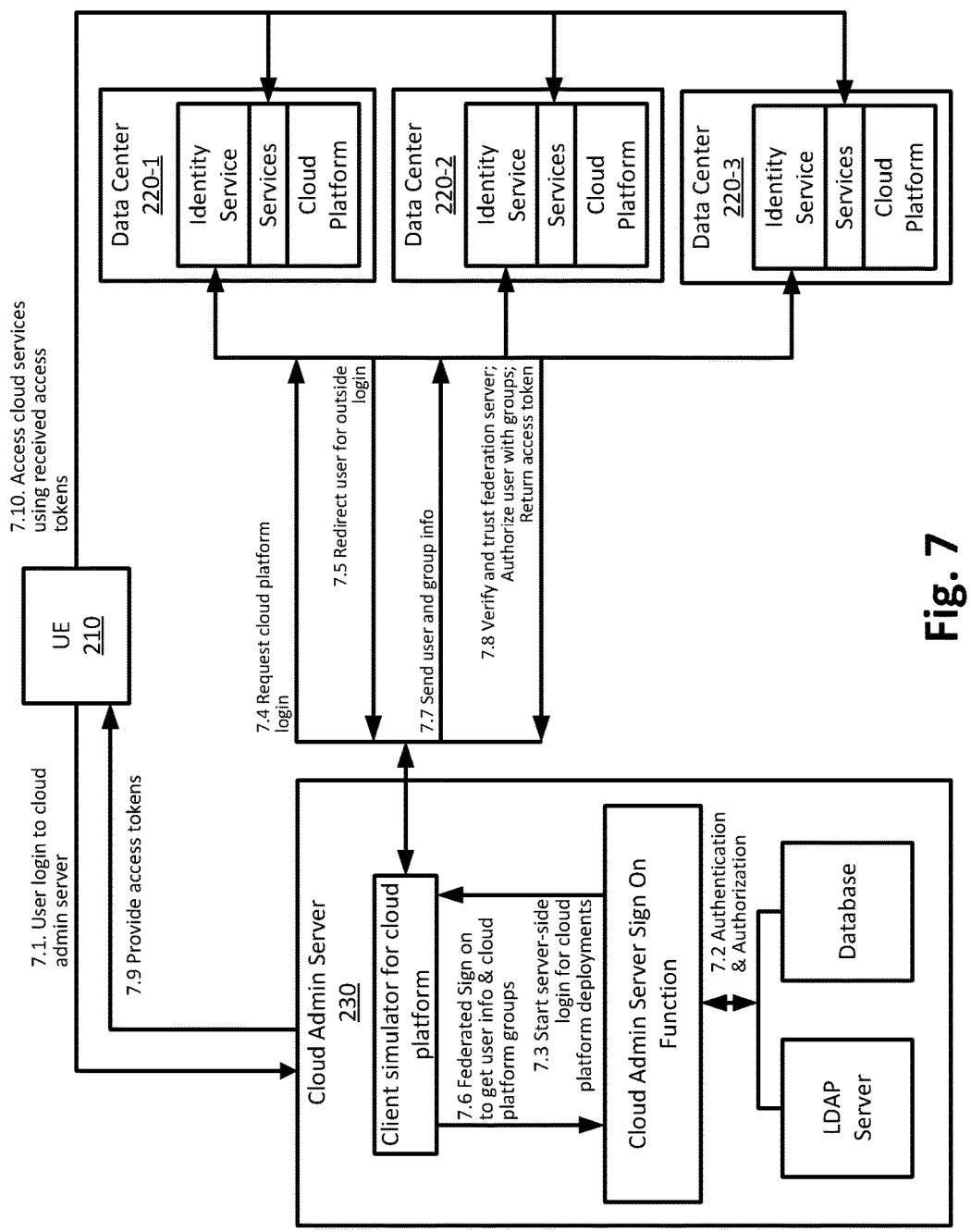
FIG. 7 is a diagram of an example embodiment of centralized authentication and authorization for a cloud platform with multiple deployments.

FIG. 7 is a diagram of an embodiment of centralized authentication and authorization for a cloud platform with multiple deployments. As shown, UE 210 may login to cloud admin server 230 (at 7.1). In one embodiment, this may include UE 210 providing cloud admin server 230 with login information, such as a username and password, an account number, etc. In response, a cloud admin server sign on function, of cloud admin server 230, may perform an authentication and/or authorization operation for UE 210 (at 7.2), which may include comparing the login information provided by UE 210 with a database of login. For example, when the login information provided by UE 210 matches login information stored in the database, cloud admin server 230 may conclude that UE 210 is permitted to access cloud services provided at one or more data centers 220.

Additionally, cloud admin server 230 may determine the particular data centers (and/or cloud platform deployments of data centers 220) that UE 210 is permitted to access based on information stored by the database. For instance, the user of UE 210 may have been previously registered for certain cloud services provided by one or more of the cloud platform deployments of data centers 220. Information describing this registration for services may be stored by the database of cloud admin server 230, such that, based on the login information from UE, cloud admin server 230 may identify the cloud platform deployments (of the data centers) providing the services for which the user of UE 210 is registered. In some embodiments (e.g., when cloud admin server 230 is unable to identify the cloud services and cloud platform deployments corresponding to the cloud services, to which the user of UE 210 is registered), cloud admin server 230 may contact each cloud platform deployment individually to determine (e.g., via an acknowledgement, handshake, and/or other type of response) from the cloud platform deployment whether the user of UE 210 is registered for cloud services provided by the cloud platform deployment. In some embodiments, cloud admin server 230 may do so by providing the cloud platform deployments with an ID corresponding to UE 210 and/or a user of UE 210, examples of which may include the username and password of the user of UE 210, a user account ID, an International Mobile Equipment Identity (IMEI), an International Mobile Subscriber Identity (IMSI), etc. The cloud platform deployments may use the ID to identify cloud services associated with the ID.

When cloud admin server 230 is not able to verify the login information provided by UE 210, cloud admin server 230 may return a login failure message to UE 210.

If/when user 210 is authenticated and authorized by the cloud admin server sign on function, cloud admin server 230 may proceed by initiating server-side login operations at multiple cloud platform deployments (e.g., cloud platform deployments at data centers 220) (at 7.3). In some embodiments, prior to starting the server-side login operations, cloud admin server 230 may determine the cloud platform deployments for which the server-side login operations are to be performed. For example, authenticating and authorizing UE 210 may enable cloud admin server 230 to determine the services (and their corresponding cloud platform deployments) for which UE 210 has been registered, and cloud admin server 230 may start the server-side login operations for each cloud platform deployment that corresponds to a service for which UE 210 is registered. As shown, this may include cloud admin server 230 using a client simulator that corresponds to the cloud platform deployments. For instance, if the cloud platforms are OpenStack platforms, then the client simulator may include an OpenStack client simulator. The client simulator may enable and/or facilitate the server-side login operations initiated by cloud admin server 230.

In some embodiments, having cloud admin server 230 use an API that corresponds to the cloud platform deployments may enable cloud admin server 230 to be treated, by the cloud platform deployments, as a client (e.g., UE 210). In some embodiments, this may be part of the client simulator mentioned above. The API may enable cloud admin server 230 to engage and complete the authentication and authorization process for each cloud platform deployment using the same (or similar) information as would be used by UE 210. As such, the techniques described herein may be implemented in a manner that does not require significant (or any) modification to existing cloud computing platforms, such as OpenStack.

In some embodiments, an example of a server-side login procedure may include one or more of the operations, depicted in FIG. 7, as 7.4 to 7.8. For example, cloud admin server 230 may communicate a request to multiple cloud platform deployments (e.g., at data centers 220-1, 220-2, and 220-3) (at 7.4). In some embodiments, each cloud platform deployment may respond with a message that includes a request for user information (at 7.5). As shown, the message may include a Redirect message that is consistent with Standard Sign On Federation protocols (as described above with reference to FIG. 6 at 6.2). However, as described below, centralizing authentication and authorization services, cloud admin server 230 may respond to the Redirect message in a different way (i.e., by proceeding with the authentication and authorization process without being redirected to another device). For example, cloud admin server 230 may respond to the Redirect message by obtaining user and group information corresponding to UE 210 (at 7.6). As shown, this may include the client simulator communicating with the cloud admin server sign on function and/or the cloud admin server sign on function communicating with the LDAP server and/or the database.

Cloud admin server 230 may provide the user and group information to the cloud platform deployments (at 7.7). As shown, in response to the user and group information, each cloud platform deployment may perform one or more operations. For example, an identification service of each cloud platform may determine (or verify) whether to trust the information received from cloud admin server 230, authorize the user and group corresponding to the user and group information received, and return an access token to cloud admin server 230 (at 7.8). Cloud admin server 230 may forward the access tokens to UE 210 (at 7.9), and UE 210 may gain access to cloud services by providing the tokens to the cloud platform deployments (at 7.10). Providing the cloud platform deployments with permission information (such as a token, a cookie, etc.), instead of user login information, may enable UE 210 to access the cloud services without requiring an authentication and authorization procedure to be performed by the cloud platform deployments.

FIG. 8 is a diagram of example components of a device 800. Each of the devices illustrated in FIGS. 1-3, 6, and 7 may include one or more devices 800. Device 800 may include bus 810, processor 820, memory 830, input component 840, output component 850, and communication interface 860. In another embodiment, device 800 may include additional, fewer, different, or differently arranged components. As described herein, a component may be implemented by hardware circuitry, software logic, and/or some combination thereof.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes (LEDs), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared (IR) receiver, a cellular radio, a Bluetooth radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, embodiments described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope set forth in the claims that follow. The specification and drawings are accordingly to be regarded in an illustrative rather than restrictive sense.

For example, while a series of lines, arrows, and/or blocks have been described regarding FIGS. 1, 4, 5, and 7 the order of the blocks and arrangement of the lines and/or arrows may be modified in other embodiments. Further, non-dependent blocks may be performed in parallel. Similarly, while series of communications have been described with regard to several of the Figures provided herein, the order or nature of the communications may potentially be modified in other embodiments.

It will be apparent that example aspects, as described above, may be implemented in many different forms of software, firmware, and hardware in the embodiments illustrated in the figures. The actual software code or specialized control hardware used to implement these aspects should not be construed as limiting. Thus, the operations and behaviors of the aspects that were described without reference to the specific software code—it being understood that software and control hardware could be designed to implement the aspects based on the description herein.

Further, certain portions may be implemented as "logic" that performs one or more functions. This logic may include hardware, such as an application-specific integrated circuit (ASIC) or a field-programmable gate array (FPGA), or a combination of hardware and software.

To the extent the aforementioned embodiments collect, store or employ personal information provided by individuals, it should be understood that such information shall be used in accordance with all applicable laws concerning protection" of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Even though particular combinations of features are recited in the claims and/or disclosed in the specification, these combinations are not intended to be limiting. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A server device, comprising:
   a non-transitory memory device storing a plurality of processor-executable instructions; and
   a processor configured to execute the processor-executable instructions, wherein executing the processor-executable instructions causes the processor to:
   receive, from a User Equipment (UE), user information indicating a plurality of cloud services provided by a plurality of cloud platform deployments, wherein each particular cloud platform deployment, of the plurality of cloud platform deployments, is configured to require a user to complete a separate sign on procedure prior to granting access to a particular cloud service associated with the particular cloud platform deployment;
   authenticate a user of the UE using a single authentication service;
   communicate with the plurality of cloud platform deployments via a simulated client browser to obtain authorization for the UE to access each cloud platform deployment, of the plurality of cloud platform deployments, the obtaining including:
     requesting, from each cloud platform deployment, a login session,
     receiving a redirect message, from each cloud platform deployment, in response to the login session request,
     providing, to each cloud platform deployment and in response to the respective redirect message from each cloud platform deployment, information indicating that the user has been previously authenticated using the single authentication service, and
     receiving, in response to providing the information indicating that the user has been previously authenticated, permission information for accessing the cloud services; and
   provide, to the UE, the permission information to enable the UE to access the plurality of cloud services.

2. The server device of claim 1, wherein the sign on procedure includes a Sign On Federation protocol.

3. The server device of claim 1, wherein each cloud platform deployment, of the plurality of cloud platform deployments, includes an instance of the OpenStack platform.

4. The server device of claim 1, wherein providing the information, indicating that the user has been previously authenticated, to each cloud platform deployment enables each cloud platform deployment to provide the permission information to the server device, without having to perform an internal authentication and authorization procedure.

5. The server device of claim 1, wherein the permission information includes a token from each cloud platform deployment, of the plurality of cloud platform deployments, for accessing the plurality of cloud services.

6. The server device of claim 1, wherein the permission information includes a cookie from each cloud platform deployment, of the plurality of cloud platform deployments, for accessing the plurality of cloud services.

7. The server device of claim 1, wherein executing the processor-executable instructions causes the processor to:
   obtain sign on information from the plurality of cloud platform deployments, the sign on information including usernames and passwords corresponding to users that are authorized to access the plurality of cloud services provided by the plurality of cloud platform deployments; and
   store the sign on information locally,
     wherein the sign on information is used, by the server device, to authenticate and authorize the UE.

8. A method, comprising:
   receiving, by a server device and from a User Equipment (UE), user information indicating a plurality of cloud services provided by a plurality of cloud platform deployments, wherein each particular cloud platform deployment, of the plurality of cloud platform deployments, is configured to require a user to complete a separate sign on procedure prior to granting access to a particular cloud service associated with the particular cloud platform deployment;
   authenticating, by the server device, a user of the UE using a single authentication service;
   communicate, by the server device, with the plurality of cloud platform deployments via a simulated client browser to obtain authorization for the UE to access each cloud platform deployment, of the plurality of cloud platform deployments, the obtaining including:
     requesting, from each cloud platform deployment, a login session,
     receiving a redirect message, from each cloud platform deployment, in response to the login session request,
     providing, to each cloud platform deployment and in response to the respective redirect message from each cloud platform deployment, information indicating that the user has been previously authenticated using the single authentication service, and
     receiving, in response to providing the information indicating that the user has been previously authenticated, permission information for accessing the cloud services; and
   providing, by the server device and to the UE, the permission information to enable the UE to access the plurality of cloud services.

9. The method of claim 8, wherein the sign on procedure includes a Sign On Federation protocol.

10. The method of claim 8, wherein each cloud platform deployment, of the plurality of cloud platform deployments, includes an instance of the OpenStack platform.

11. The method of claim 8, wherein providing the information, indicating that the user has been previously authenticated, to each cloud platform deployment enables each cloud platform deployment to provide the permission information to the server device, without having to perform an internal authentication and authorization procedure.

12. The method of claim 8, wherein the permission information includes a token from each cloud platform deployment, of the plurality of cloud platform deployments, for accessing the plurality of cloud services.

13. The method of claim 8, wherein the permission information includes a cookie from each cloud platform deployment, of the plurality of cloud platform deployments, for accessing the plurality of cloud services.

14. The method of claim 8, further comprising:
obtaining sign on information from the plurality of cloud platform deployments, the sign on information including usernames and passwords corresponding to users that are authorized to access the plurality of cloud services provided by the plurality of cloud platform deployments; and
store the sign on information locally,
wherein the sign on information is used, by the server device to authenticate and authorize the UE.

15. A non-transitory computer-readable medium storing a plurality of processor-executable instructions, wherein executing the processor-executable instructions causes one or more processors to:
receive, from a User Equipment (UE), user information indicating a plurality of cloud services provided by a plurality of cloud platform deployments, wherein each particular cloud platform deployment, of the plurality of cloud platform deployments, is configured to require a user to complete a separate sign on procedure prior to granting access to a particular cloud service associated with the particular cloud platform deployment;
authenticate a user of the UE using a single authentication service;
communicate with the plurality of cloud platform deployments via a simulated client browser to obtain authorization for the UE to access each cloud platform deployment, of the plurality of cloud platform deployments, the obtaining including:
requesting, from each cloud platform deployment, a login session,
receiving a redirect message, from each cloud platform deployment, in response to the login session request,
providing, to each cloud platform deployment and in response to the respective redirect message from each cloud platform deployment, information indicating that the user has been previously authenticated using the single authentication service, and
receiving, in response to providing the information indicating that the user has been previously authenticated, permission information for accessing the cloud services; and
provide, to the UE, the permission information to enable the UE to access the plurality of cloud services.

16. The non-transitory computer-readable medium of claim 15, wherein the sign on procedure includes a Sign On Federation protocol.

17. The non-transitory computer-readable medium of claim 15, wherein each cloud platform deployment, of the plurality of cloud platform deployments, includes an instance of the OpenStack platform.

18. The non-transitory computer-readable medium of claim 15, wherein providing the information, indicating that the user has been previously authenticated, to each cloud platform deployment enables each cloud platform deployment to provide the permission information to the server device, without having to perform an internal authentication and authorization procedure.

19. The non-transitory computer-readable medium of claim 15, wherein the permission information includes a token from each cloud platform deployment, of the plurality of cloud platform deployments, for accessing the plurality of cloud services.

20. The non-transitory computer-readable medium of claim 15, wherein the permission information includes a cookie from each cloud platform deployment, of the plurality of cloud platform deployments, for accessing the plurality of cloud services.

* * * * *